United States Patent [19]

Smith, Jr. et al.

[11] Patent Number: 4,482,249

[45] Date of Patent: * Nov. 13, 1984

[54] ELECTROMAGNETIC WAVE RING RESONATOR

[75] Inventors: Irl W. Smith, Jr., Newton; Terry A. Dorschner, Newton Center, both of Mass.

[73] Assignee: Raytheon Company, Lexington, Mass.

[*] Notice: The portion of the term of this patent subsequent to Aug. 29, 1995 has been disclaimed.

[21] Appl. No.: 442,473

[22] Filed: Nov. 17, 1982

Related U.S. Application Data

[60] Continuation of Ser. No. 141,873, Apr. 21, 1980, abandoned, which is a continuation of Ser. No. 936,164, Aug. 23, 1978, abandoned, which is a division of Ser. No. 646,308, Jan. 2, 1976, Pat. No. 4,110,045.

[51] Int. Cl.$^3$ ............................................. G01C 19/64
[52] U.S. Cl. ................................................. 356/350
[58] Field of Search ................. 356/350, 351; 350/394

[56] References Cited

U.S. PATENT DOCUMENTS

3,382,759 5/1968 Macek .
3,741,657 6/1973 Andringa .
3,841,758 10/1974 Gievers .
3,890,047 6/1975 Warner .
4,110,045 8/1978 Smith, Jr. et al. .

OTHER PUBLICATIONS

"Gaussian Light Beams with General Astigmatism" by J. A. Arnaud and H. Kogelnik, Applied Optics, Aug. 1969.
"Nonorthogonal Optical Waveguides and Resonators" by J. A. Arnaud, The Bell System Technical Journal, Nov. 1970.
"Degenerate Optical Cavities" by J. A. Arnaud, Applied Optics, Jan. 1969.
"CO$_2$ Laser Gyro Using Polarizationally Isotropic Cavity", by G. B. Jacobs; Applied Optics, vol. 10, No. 1, Jan. 1971.

*Primary Examiner*—Vincent P. McGraw
*Attorney, Agent, or Firm*—Richard M. Sharkansky; Joseph D. Pannone

[57] ABSTRACT

An electromagnetic wave ring resonator is disclosed wherein field distribution of electromagnetic waves are spatially rotated about the direction of propagation of such waves in said resonator. With such arrangement the electromagnetic field distribution rotation produces a phase difference between waves of opposite polarization senses, thereby enabling the waves to resonate with different frequencies. In a laser gyroscope the electromagnetic field distribution may be achieved by a catoptric arrangement which reduces the loss, scatter and linear birefringence associated with the ring resonator of the gyroscope.

15 Claims, 6 Drawing Figures

ELECTROMAGNETIC WAVE RING RESONATOR

CROSS-REFERENCE TO RELATED CASES

This is a continuation of application Ser. No. 141,873, filed Apr. 21, 1980 now abandoned which is a continuation of application Ser. No. 936,164, filed Aug. 23, 1978 now abandoned which is a division of application Ser. No. 646,308, filed Jan. 2, 1976, now U.S. Pat. No. 4,110,045.

BACKGROUND OF THE INVENTION

This invention relates generally to electromagnetic wave resonators, and more particularly to electromagnetic wave resonators adapted for use in laser gyroscope apparatus.

As described in U.S. Pat. No. 3,741,657 entitled "Laser Gyroscope," Keimpe Andringa inventor, issued June 26, 1973 and assigned to the same assignee as the present invention, a laser ring resonator supports four optical waves, each one of such waves having a different frequency, one pair thereof traveling in a clockwise direction and the other pair thereof traveling in a counterclockwise direction. The optical pathlengths of the waves are such that the pair of frequencies of the waves traveling in one direction, say the counterclockwise direction, is positioned between the frequencies of the waves traveling in the opposite, or clockwise, direction.

Having established this frequency relationship, movement of the laser resonator, for example by rotation of the system about an axis perpendicular to the optical path, produces frequency shifts of the pair of waves propagating in one direction through the laser which are opposite to frequency shifts of the waves moving in the opposite direction through the laser. This, in turn, produces changes in the frequency separation between the lower frequencies of each of said pairs. The difference between such changes is, substantially, a linear function of the rate of said rotation and the relative sense of such difference is indicative of the direction of said rotation.

As described in the referenced U.S. Pat. No. 3,741,657, such frequency separation results from disposing in the path of the waves a polarization dispersive structure which comprises a Faraday rotator and a crystal rotator. The crystal rotator is an anisotropic medium which restricts the type of polarization of the waves which may be supported in the ring laser to substantially circular polarization and also provides a different optical pathlength for right-hand sense circularly polarized waves than for left-hand sense circularly polarized waves. The Faraday rotator is a nonreciprocal device and provides different time delays to waves of each polarization sense passing in the laser ring in one direction from those of such polarization sense passing in the opposite direction. The combination of the crystal rotator and Faraday rotator provides the four frequency relationship discussed above.

While the described polarization dispersive structure has been found satisfactory in many applications, the use of a crystal rotator increases loss and scatter imparted to the propagating waves and introduces linear birefringence to the ring resonator thereby reducing the accuracy of a laser gyroscope using such polarization dispersive structure.

SUMMARY OF THE INVENTION

According to the present invention an electromagnetic wave ring resonator includes means for spatially rotating the electromagnetic field distribution of electromagnetic waves resonant therein about the direction of propagation of such waves. With such arrangement such rotating means provides a phase difference between waves of opposite polarization sense thereby enabling such waves to resonate in such resonator with different frequencies.

In a preferred embodiment a laser ring resonator includes a plurality of reflectors positioned in the path of the laser to spatially rotate the electromagnetic field distribution of the laser waves resonant therein and thereby provide a predetermined phase alteration to the waves resonant therein. Such phase alteration correspondingly alters the resonant frequency of each one of such waves in the ring resonator without requiring a crystal rotator in such path to alter the optical pathlength of such laser. Since the phase alteration sense is opposite for opposite senses of circular polarization, such arrangement enables waves of opposite polarization sense to resonate at separate frequencies. The reflectors are preferably oriented to provide a $\pi$ radian phase difference between right and left-hand circularly polarized waves.

BRIEF DESCRIPTION OF THE DRAWINGS

Other and further features and advantages of the invention will become apparent as the description thereof progresses, reference being made to the accompanying drawings wherein.

DESCRIPTION OF THE PREFERRED EMBODIMENTS

Figure 1:
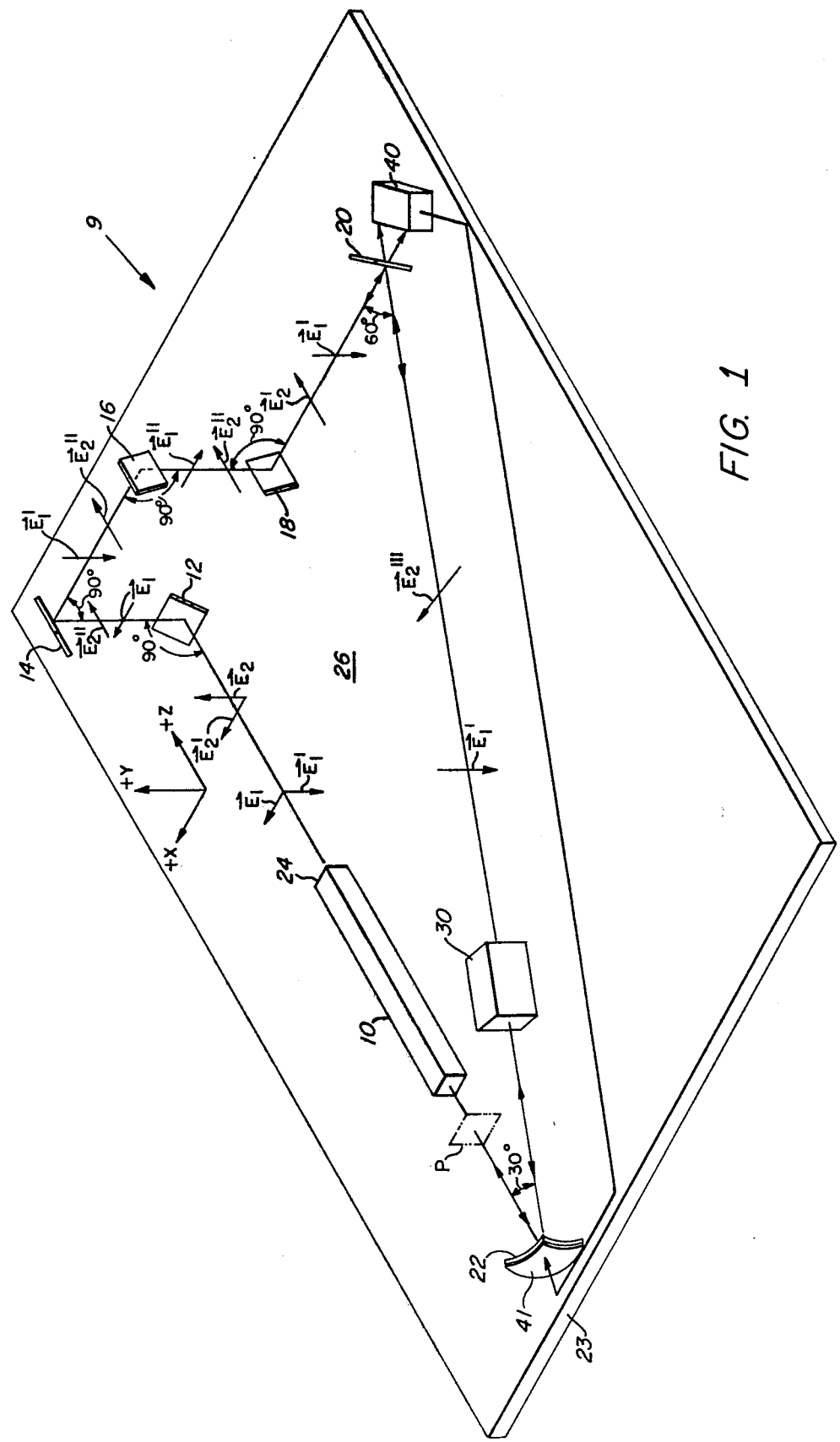
FIG. 1 illustrates a diagrammatic view of a ring resonator embodying the invention.

Referring now to FIG. 1 there is shown a laser gyroscope system 9 having a laser amplifier medium 10 (here a helium-neon laser medium having a gas mixture: $8\ {}^3He + 0.48\ {}^{22}Ne + 0.52\ {}^{20}Ne$. A ring laser resonator includes an even number of reflectors, here six reflectors 12, 14, 16, 18, 20, 22 (suitably mounted, by means not shown, to the surface of a platform 23) which produce a ring path for the laser beams. It is here noted that, as will be described later in connection with FIG. 4, the desired ring path may be produced by as few as four properly positioned reflectors. However, the six reflector system will first be discussed in order to establish the principle of operation of the laser gyroscope system. Considering the laser beam produced at end 24 of the laser amplifier medium 10, such beam travels along the $+Z$ direction (i.e. along the longitudinal axis of the laser amplifier medium 10) through an isotropic medium, preferably substantially free space, and is first reflected by reflector 12. The reflector 12 has its reflecting surface oriented such that the laser beam is reflected vertically a distance $d_1$ along the $+Y$ direction to reflector 14. Reflector 14 has its reflective surface oriented such that the beam incident thereon becomes reflected horizontally a distance $d_2$ along the $-X$ direction to reflector 16. Reflector 16 has its reflective surface oriented so that the beam incident thereon becomes reflected vertically a distance $d_1$ along the $-Y$ direction to reflector 18. Reflector 18 has its reflective surface oriented so that the beam incident thereon becomes reflected horizontally a distance $d_3$ along the $-X$ direction to reflector 20. It is here noted that the beam passing from end 24 of laser amplifier medium 10 to reflector 12 and the beam passing from reflector 18 to reflector 20 are orthogonal to each other and define a common horizontal plane 26. The surface of the platform 23 is disposed in a plane parallel to the horizontal plane 26. Therefore, the beams passing from reflector 12 to reflector 14 to reflector 16 to reflector 18 are disposed in a vertical plane. Continuing, reflector 20 has its reflective surface oriented so that the beam indicent thereon is reflected to reflector 22, the incident beam and the reflected beam being disposed in the horizontal plane 26 and having an included angle here of 60 degrees. Reflector 22, here having a concave surface to aid in concentrating the laser beam through the laser amplifier medium 10 (i.e. to aid in establishing a resonant transverse mode), has its reflective surface oriented so that the beam incident thereon is reflected again along the longitudinal axis of the laser amplifier medium 10, as shown, such incident and reflected beams being disposed in the horizontal plane 26 and having an included angle here of 30 degrees. The distance between reflectors 22 and 12 along the $+Z$ axis is $d_4$.

It is here noted that, for purposes of explanation, the following description neglects the effect of 180° phase changes imparted to an electric field component upon reflection by a reflector. Such consideration is appropriate here because the ring resonators described herein include an even number of reflectors in the path of the resonant waves and hence the effect of such phase changes cancel upon traversal of the waves through the ring resonator.

Considering the beam produced at end 24 of laser amplifier medium 10 and traveling along the $+Z$ axis to have an electric field component $E_1$, disposed along the $+X$ axis, such electric field component remains along the $+X$ axis after reflection by reflector 12, then becomes oriented along the $-Y$ axis to the electric field component $E_1''$ because of reflector 14, then becomes oriented along the $-X$ axis because of reflector 16, then becomes oriented along the $-Y$ axis because of reflector 18 and remains so oriented when it returns to end 24. The effect of the reflectors 12-22 on the orientation of such electric field component $E_1$ is to rotate into such component $-90$ degrees about the beam axis (i.e. the $+Z$ axis) to the electric field component $E_1'$.

Considering now the beam produced at the end 24 of laser amplifier medium 10 and traveling along the $+Z$ axis to have an electric field component, $E_2$, disposed along the $+Y$ axis, such component first becomes oriented along the $+Z$ axis (to electric field component $E_2''$) because of reflector 12, remains oriented along the $+Z$ axis after reflections by reflectors 14, 16 and 18, then becomes disposed in the X-Z plane at a $-30°$ angle with respect to the $+X$ axis (to electric field component $E_2'''$) and then, after reflection by reflector 22, becomes oriented along the $+X$ axis at the end 24 to electric field component $E_2'$. The effect of the reflectors 12-22 on the orientation of such electric field component $E_2$ is to rotate such component $-90$ degrees about the beam axis. The effect of a passage around the ring may thus be symbolized:

$$E_1 \longrightarrow E_1' = -E_2$$

$$E_2 \longrightarrow E_2' = E_1$$

Figure 2A:
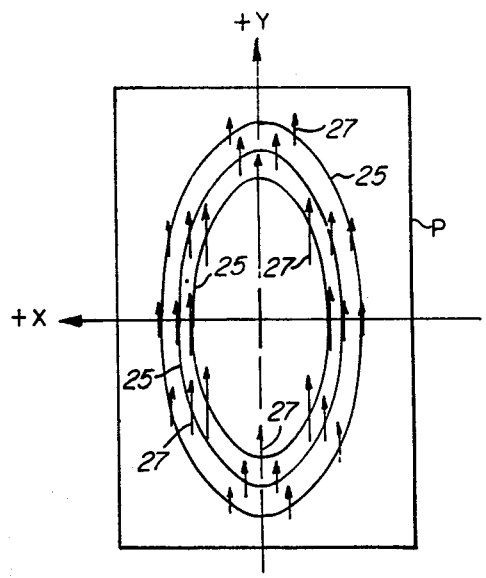
FIGS. 2A–2C are sketches useful in understanding the invention.
Figure 2B:
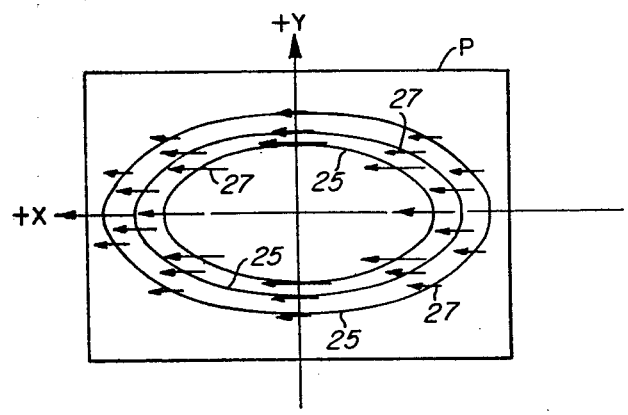
Figure 2C:
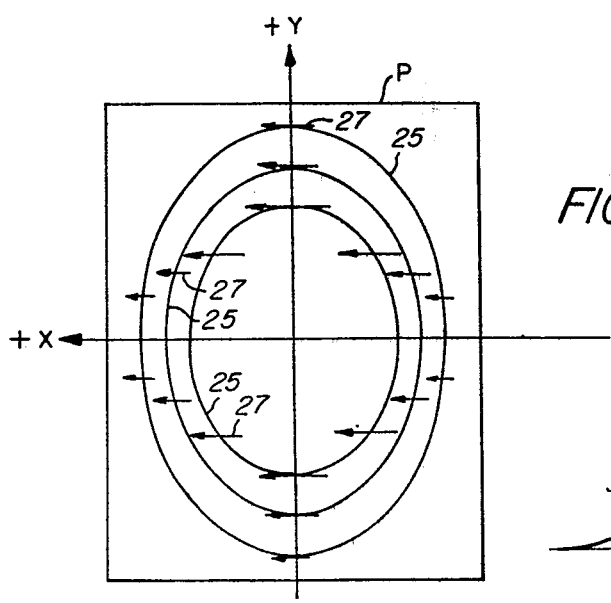

The effect of reflectors 12, 14, 16, 18, 20, 22 then is to rotate the electromagnetic field distribution of waves passing around the ring resonator $-90$ degrees in the plane orthogonal to the optical path of such waves. The electromagnetic field distribution refers to both the intensity and direction (i.e. polarization or electric field vector) of an electromagnetic wave at a point in space. For example, if the electromagnetic field distribution of waves produced by the laser amplifier medium 10 has, in the plane P, isophotes (lines 25 of equal intensity) which are elliptically shaped having vertical major axes and vertically oriented electric field components 27 as represented in FIG. 2A, the effect of the reflectors 12-22 is (1) to rotate the electromagnetic field distribution so that such electric field components and the major axis of the isophotes are oriented horizontally (as shown in FIG. 2B) and (2) to distort such distribution because of diffraction and because of the concave surface of reflector 22, as shown in FIG. 2C. It is noted that in order for waves to resonate, that is, be a stable mode of the ring resonator, such waves, after passing once around such resonator, must return to a given point with their original electromagnetic field distribution. However, in general, neither the shape of the isophotes nor the polarization (electric field direction) in a given plane will remain unchanged in such plane after passing once around the resonator. Waves having a frequency which is capable of being a resonant frequency will acquire an intensity distribution for which the diffraction of the waves and the focusing of reflector 22 are balanced so that the waves which are resonant have the same intensity distribution upon transversal of the resonator. However, only for circularly polarized waves is the polarization also able to return to its initial state after one traversal. Thus, the only self-consistent electromagnetic field distribution which may exist in the resonator is that of waves having circular polarization. The isophotes of such resonant waves will acquire a shape which enables support of such circularly polarized waves in the ring resonator. Further, if the circular polarization of such waves has a right-hand sense polarized component, i.e.

$$E_r = [E_1 \longrightarrow E_2 e^{i\pi/2}] e^{-i\omega t}$$

the effect of the reflectors 12-22 is to transform such component into $$E_r' = [E_1' \longrightarrow E_2' e^{i\pi/2}] e^{i2\pi L/\lambda} e^{-i\omega t}$$

$$= [-E_2 \longrightarrow E_1 e^{i\pi/2}] e^{i2\pi L/\lambda} e^{-i\omega t}$$

$$= e^{i\pi/2} e^{i2\pi L/\lambda} E_r$$

where L is the length of the path around the ring, measured along the beam axis.

If the circular polarization of such waves has a left-hand sense polarization component, i.e.

$$E_l = [E_1 \longrightarrow E_2 e^{-i\pi/2}]e^{-i\omega t}$$

the effect of a passage around the ring is to transform it to $$E_l' = [E_1' \longrightarrow E_2' e^{i\pi/2}]e^{i2\pi L/\lambda}e^{-i\omega t}$$

$$= [-E_2 \longrightarrow E_1 e^{-i\pi/2}]e^{i2\pi L/\lambda}e^{-i\omega t}$$

$$= e^{-i\pi/2}e^{i2\pi L/\lambda}E_l$$

The relative phase difference between the left and right-hand components is, then, $$[e^{i\pi/2}e^{i2\pi L/\lambda}]/[e^{i2\pi L/\lambda}e^{-i\pi/2}] = e^{+i\pi} \text{ or } 180 \text{ degrees}$$

Further, it should be noted that the effect of reflectors 12-22 is to alter the phase of the wave passing through the resonator, here $+\pi/2$ for right-hand sense polarized waves and $-\pi/2$ for left-hand sense polarized waves. Because the optical pathlengths of the waves in the resonator are the same, as neither wave passes through a medium (here neglecting the Faraday rotator 30 in order to understand the function of reflectors 12-22) to alter such optical pathlength, the phase alteration provided by such reflectors 12-22 correspondingly alters the resonant frequencies of such waves, the resonant frequencies of the waves of different sense of polarization altering oppositely. The result is that the waves of right-hand sense polarization will have a resonant frequency different from the resonant frequency of the left-hand sense polarized waves. This effect may be understood by considering a right-hand sense polarized wave to be represented as:

$$E_R = R_e[e_R] = X \cos(\beta S - \omega t) - Y \sin(\beta S - \omega t)$$

where X, Y and Z are orthogonal unit vectors, S being measured along the direction of propagation of the wave, $\omega$ being the angular rotational rate of the electric field vector and $\beta = 2\pi f/c = 2\pi\lambda$ where f and $\lambda$ are the frequency and wavelength, respectively, of such wave and c is the velocity of light.

In order for such wave to resonate in a resonator, without an electromagnetic field distribution rotation means, having optical pathlength L, $\beta$ and L must satisfy the following:

$\beta L = 2n\pi$ (where n is an integer) and hence the resonant frequencies of such waves are $$f_o = nc/L$$

The effect of rotating the electric field vector of such a wave in the manner described above in connection with FIG. 1 is, as described, to change the phase of such wave and hence such phase altered wave may, for right-hand sense polarization, be represented by $$E_R = R_e[e_R'] = X \cos(\beta S - \omega t + \pi/2) - Y \sin(\beta S - \omega t + \pi/2)$$

For resonance, $\beta$ and L must then satisfy $$\beta L + \pi/2 = 2n\pi,$$

and therefore the resonant frequencies of such wave have been changed to $f_r'$ where $$f_r' = c/2\pi L(2n\pi - \pi/2)$$

Considering left-hand sense polarized waves, it follows that such resonant frequency will change, because of the electric field rotation described above, to $$f_R' = c/2\pi L(2n\pi + \pi/2)$$

In summary, then, a phase alteration of $\phi$ (radians) of opposite sense for opposite polarization senses correspondingly separates the resonant frequencies of opposite sense polarized waves by $$\Delta f = c/2\pi L(2\phi)$$

It further follows that such reflectors 12-22 have a reciprocal effect: that is, the phase delay will be effected for waves exiting at end 24 of the laser amplifier medium 10 along the +Z axis, (i.e. clockwise) and for waves entering such end 24 along the —Z axis (i.e. counterclockwise).

Figure 3:
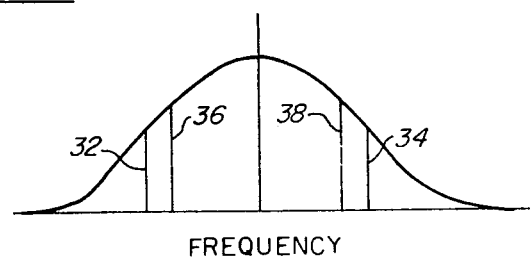
FIG. 3 illustrates a diagram of operating characteristics of the system illustrated in FIG. 1.

A conventional solid medium Faraday rotator 30, here including a fused silica window with a conventionally mounted permanent magnet (not shown) is suitably mounted to the platform 23 by any convenient means (not shown). Such Faraday rotator 30 is a non-reciprocal device and produces a phase delay for waves of either circular polarization sense traveling clockwise which is different from that for waves of similar polarization traveling counterclockwise. The combination of the reflectors 12-22 and the Faraday rotator 30 is such that the ring resonator supports waves having frequencies of oscillation as shown in FIG. 3, the two waves 32, 34 traveling clockwise and the two waves 36, 38 traveling counterclockwise, the two waves traveling clockwise having opposite sense circular polarization and the two waves traveling counterclockwise also having opposite sense circular polarizations. These frequencies are shown as positive or negative differences from the center of maximum gain frequency of the laser amplifier medium 10.

Mirror 20 is here partially transmissive (typically less than 0.1 percent) to enable a portion of the waves traveling clockwise and the waves traveling counterclockwise to pass to the stabilization system and utilization device 40. Alternatively, specular reflections from the surfaces of the various components in the resonator may be directed, by any conventional optical means (not shown), to such stabilization system and utilization device 40. Here such device 40 includes a differential amplifier (not shown) to produce an electrical signal for a piezoelectric element 41 suitably affixed to the reflector 22 to control the position of reflector 22 thereby to maintain the four frequencies symmetrically about the center maximum gain frequency curve of the laser amplifier medium 10 and also includes counters (not shown) for providing an indication of the rotational rate of the laser resonator about the gyroscope axis. Such stabilization system and utilization device 40 is described in the referenced U.S. Pat. No. 3,741,657.

It is here noted that two different isotopes of neon are used in the laser amplifier medium 10, i.e. $^{22}$Ne and $^{20}$Ne. Two different isotopes of lasing medium are provided so that each one of the four waves interacts with a different set of the atoms of the lasing medium, i.e. atoms with different velocities, when the cavity length is stabilized to maintain the four frequencies symmetrically about the center maximum gain curve of the laser amplifier medium. In this regard, the $^{20}$Ne isotope constitutes 52% of the neon atoms in order to compensate for its lesser atomic weight. That is, in order for the maximum gain associated with a composite laser medium to be half way between the resonant frequencies associated with the two isotopes, a greater percentage of $^{20}$Ne is used (i.e. 52%) as compared with $^{22}$Ne (i.e. 48%). With this arrangement the different sets of atoms interacting with corresponding ones of the four waves will have maximum isolation from each other.

The orientation of the gyroscope axis is along the vector G. Such vector G is calculated by the following line integral:

$$G = \oint r \times dr$$

where dr is the direction of travel along the path at a point on such path and r is the position vector of such point. Considering the ring resonator described in FIG. 1, it is noted that such waves in the resonator pass in two orthogonal planes, i.e. the horizontal plane 26 and the vertical plane. The area enclosed in the horizontal plane is $A_1 = \frac{1}{2}(d_2+d_3)d_4$. The area enclosed in the vertical plane is $A_2 = d_2 d_1$. The gyroscope axis then is along the vector G where $$G = [+A_1 Y - A_2 Z]$$

Figure 4:
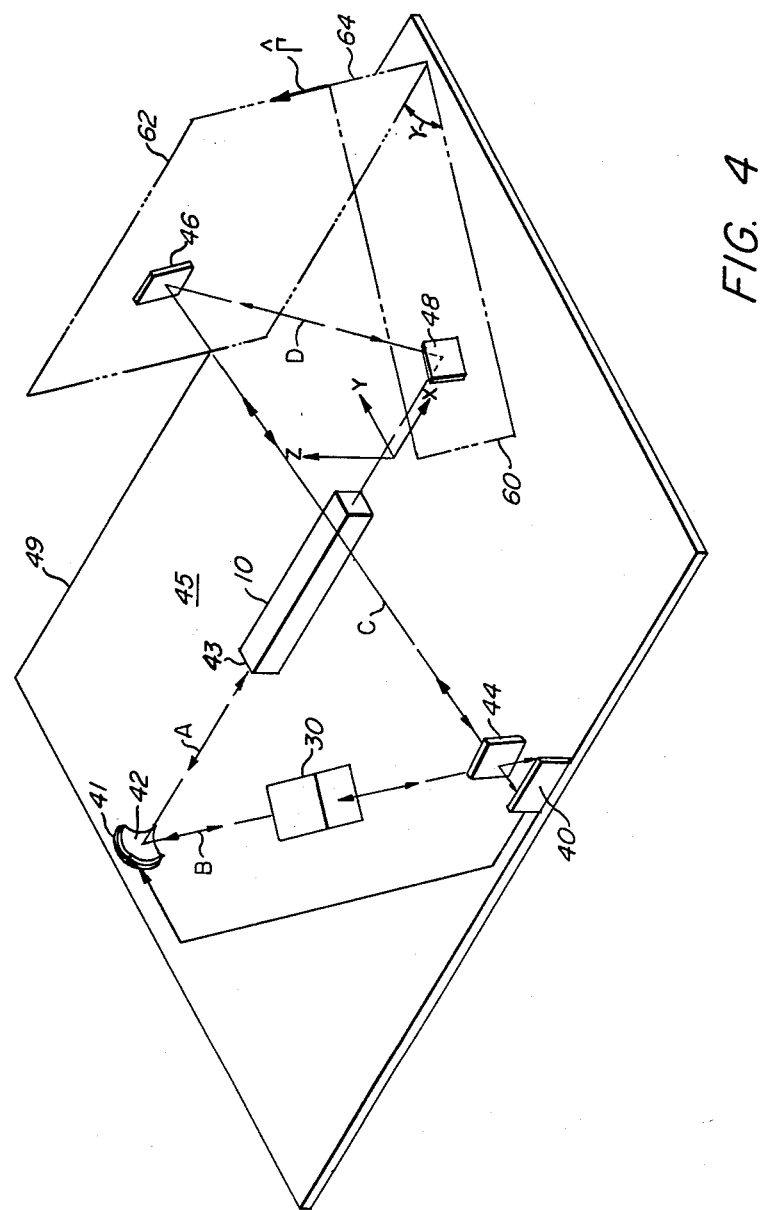
FIG. 4 illustrates a diagrammatic view of an alternative embodiment of a ring resonator according to the invention.

Referring now to FIG. 4 a laser ring resonator here includes laser amplifier medium 10 and four reflectors, i.e. reflectors 42, 44, 46, 48 positioned as shown to enable such resonator to support waves having circular polarization and so that right-hand sense circularly polarized waves have a different phase alteration than the left-hand sense circularly polarized waves, such laser amplifier medium 10 and reflectors 42-48 being suitably mounted by conventional means (not shown) to a platform 49. A Faraday rotator 30 is included to enble such laser resonator to support circularly polarized waves having four different frequencies thereby enabling such apparatus to be used as a four frequency laser as described in connection with FIG. 1. Also, stabilization system and utilization device 40 is included to control the position of reflector 42 (such reflector 42 having a piezoelectric element 41 mounted thereto) by responding to the portion of the waves passing through reflector 44, as discussed in connection with FIG. 1.

It is noted that the laser waves incident on and reflected by reflector 42 (here having a concave surface) are disposed in a plane 45 parallel to the plane of the platform 49. Considering the waves produced at the output of end 43 of laser medium 10, reflector 44 directs the beam incident thereon out of the plane 45 to reflector 46. Reflector 46 directs the beam incident thereon to reflector 48, the latter reflector redirecting such beam along the longitudinal axis of the laser amplifier medium 10 in the plane parallel to the plane of the platform 49 (as shown). That is, segments A and B are disposed in the plane parallel to the plane of the platform 49 and segments C and D are disposed in a plane which intersects the plane of platform 49.

The reflectors 42-48 are oriented to rotate the electromagnetic field distribution of the waves resonant in the ring laser $-\pi/2$ radians about the direction of propagation of such waves as such waves traverse the ring resonator. In order to determine the proper orientation of such reflectors it may be helpful to analyze the reflections produced by pairs of reflectors 42-48. First, considering reflectors 46 and 48, it should be noted that the surfaces of such reflectors are disposed in two intersecting planes, 60, 62, (shown in phantom) respectively. Such planes intersect along a dihedral axis 64 and form a dihedral angle $\gamma$. The dihedral axis is disposed along the unit vector r. As is known, two successive reflections of an image are equivalent to a rotation of such image through an angle $2\gamma$ about the dihedral axis formed by the intersecting planes in which the surfaces of such reflectors are disposed. That is, if the normals to the surfaces of the reflectors are $n_1$ and $n_2$, respectively, $$\Gamma \sin \gamma = n_1 \times n_2$$

Referring again to FIG. 4, reflectors 46, 48 are oriented so that the waves passing in segment C of the ring resonator are, after reflection by such reflectors 46, 48, directed along the longitudinal axis of the laser medium 10 when such waves pass in segment A (between reflectors 42 and 48) of such resonator (as shown). With such orientation of reflectors 46, 48 the electromagnetic field distribution of waves in segment C will, in segment A, be rotated by such reflectors $2\gamma$ degrees about the unit vector r. Similarly, a dihedral angle and axis direction is associated with reflectors 42 and 46, and the electromagnetic field distribution of waves in segment A will, in segment C, be additionally rotated in accordance with such angle and axis direction. In order to effectuate a $-\pi/2$ radian rotation of the electromagnetic field distribution about the direction of propagation thereby to provide a $\pi$ radian phase difference between right and left-hand circularly polarized waves, such reflectors 42-48 may have the following orientations:

| Reflector | Direction Cosine of Normal to Surface of Reflector | | |
|---|---|---|---|
| | X Axis | Y Axis | Z Axis |
| 42 | 0.866413 | −.499328 | 0.0 |
| 44 | .003688 | .999298 | .037273 |
| 46 | −.209766 | −.722611 | −.658659 |
| 48 | −.769676 | +.164503 | +.616877 |

It is noted that with such orientation reflectors 42 and 44 rotate the electromagnetic field distribution of propagating waves of one circular polarization sense −4.300 degrees and reflectors 46, 48 rotate the electromagnetic field distribution of such waves −85.700 degrees, the total rotation being −90 degrees.

In such configuration, segment A is here 15.7 centimeters (cm.).

The optical pathlength around the ring resonator is here 50 cm. Therefore, because the intermode spacing for resonant modes (for waves of a particular polarization), $\Delta\nu$, is given by $\Delta\nu = c/l$, where c is the velocity of light and l is the optical pathlength, $\Delta\nu$ here equals 600 MHz. Because the reflectors 42-48 are arranged to provide a 180° phase difference between oppositely polarized waves, the frequency separation between such waves of opposite polarization is 300 MHz, that is, half the intermode spacing, i.e. $\Delta\nu/2$. It is noted that the 180° phase difference provides maximum separation between such oppositely polarized waves. Further, such separation varies from zero to such maximum as the phase difference varies from 0° to 180°. As the phase difference increases from 180° to 360° the separation correspondingly varies from such maximum back to zero.

It is now readily apparent from the foregoing that the catoptric arrangement used to rotate the electromagnetic field distribution of the waves propagating through the ring resonator to establish circularly polarized waves of opposite polarization sense, each having a different resonant frequency, reduces the loss and scatter associated with the resonator when compared to an arrangement which includes an anisotropic crystal rotator to establish such different resonant frequency circularly polarized waves. Further, such catoptric arrangement reduces the amount of linear birefringence in the resonator by removing the anisotropic crystal rotator and hence reduces the degree of ellipticity resulting therefrom on the propagating waves as compared with such anisotropic crystal rotator. Misalignment in the optic axis of of such rotator may give rise to an undesirable residual ellipticity. Such residual ellipticity causes undesirable instabilities in a ring resonator having such crystal rotator. The catoptric system herein described has thereby effectively eliminated this source of residual ellipticity and therefore reduces this instability. Further removal of the anisotropic medium of the crystal rotator eliminates the Fizeau-Fresnel drag effect on waves passing through such medium. Still further, the gain of the resonator is improved by elimination of the loss attributable to the two relatively lossy anti-reflection coatings generally used on the surfaces of a crystal rotator.

Having described preferred embodiments of the invention, it is now evident that other embodiments incorporating these concepts may be used. For example, other lasing media including other mixtures of neon isotopes may be used for the laser amplifier medium 10. It should therefore be clearly understood that the details of such embodiments are set forth by way of example only and it should be understood that it will now be readily apparent to those of skill in the art that various changes in form and detail thereof may be made therein without departing from the spirit and scope of the invention as defined by the appended claims.

What is claimed is:

1. The method of producing different frequencies in an electromagnetic wave ring resonator comprising the steps of:
   spatially rotating the electromagnetic field distribution of electromagnetic waves passing around said ring resonator about the direction of propagation of such waves while said waves pass through a non-solid medium providing a predetermined phase difference between a pair of resonant waves to produce such pair of the waves with opposite senses of circular polarizations and with different resonant frequencies; and
   imparting different phase delays to said electromagnetic waves produced in said resonator with the same circular polarization sense and propagating in the resonator in opposite directions.

2. The method in accordance with claim 1 wherein: said step of producing different phase delays comprises propagating said waves through a solid medium.

3. The method in accordance with claim 1 wherein: said step of spatially rotating said field distribution of said waves comprises sequentially reflecting said waves from a plurality of reflectors along path portions defining different intersecting planes to provide phase differences.

4. The method of determining the rotation rate of an electromagnetic wave ring resonator comprising the steps of:
   (a) producing two pairs of circularly polarized waves in said resonator, a first pair of the two pairs of waves having a first sense of circular polarization and a second pair of the two pairs of waves having a second, opposite sense of circular polarization, the two waves in each of the two pairs of waves traveling in the resonator in opposite directions, each of the waves in the two pairs of waves having different frequencies, the frequencies of the waves traveling in one direction being between the frequencies of the waves traveling in the opposite direction, comprising:
      (i) spatially rotating the electromagnetic field distribution of said waves while said waves pass through a non-solid medium producing pairs of waves having opposite circular polarization senses propagating around said ring resonator in opposite directions; and
      (ii) imparting different phase delays to electromagnetic waves having the same circular polarization sense and propagating in said resonator in opposite directions to enable such waves to resonate at different frequencies comprising propagating said waves through a solid optically transparent medium in a substantially steady state magnetic field; and
   (b) detecting differences in the frequencies of said waves produced in said resonator.

5. An electromagnetic wave ring resonator comprising:
   means for spatially rotating the electromagnetic field distribution of resonant electromagnetic waves in a non-solid medium about the optic axis of such waves within said ring resonator to enable said waves to resonate at different frequencies and with opposite states of circular polarization;
   means for producing different phase delays in electromagnetic waves having the same polarization state propagating in said resonator in opposite directions comprising a solid optically transparent region of the path of said waves in a steady state magnetic field; and
   means for detecting differences in the frequencies of said waves propagating in said resonator.

6. The electromagnetic wave ring resonator of claim 5 wherein:
   said means for spatially rotating said distribtion of said waves comprises a plurality of reflectors providing phase differences between circularly polarized electromagnetic waves of opposite polarization senses.

7. An electromagnetic wave ring resonator comprising:
   a plurality of reflectors for directing electromagnetic waves along a predetermined path around said ring resonator, with one segment of said path being disposed in a first plane and a second segment of said paths being disposed in a second plane intersecting said first plane, to provide a phase difference between circularly polarized waves of opposite polarization senses thereby enabling said waves of opposite polarization senses to resonate at respectively different frequencies;

means for producing different phase delays in electromagnetic waves having the same polarization sense propagating in said resonator in opposite directions; and means for extracting portions of said waves from said resonator.

8. The electromagnetic wave ring resonator in accordance with claim 7 wherein:

said wave extracting means comprises a plurality of detectors; and means for directing waves derived from the same polarization senses and different propagating directions within said resonator onto each of said detectors.

9. The electromagnetic ring resonator in accordance with claim 7 wherein:

a portion of said path comprises a solid medium.

10. The electromagnetic ring resonator of claim 9 wherein:

at least a portion of said path comprises an isotropic medium.

11. An electromagnetic wave ring resonator comprising:

a plurality of reflectors providing a phase difference between circularly polarized waves of opposite polarization senses passing around said resonator to enable said waves of opposite polarization senses to resonate at respectively different frequencies;

means for producing different phase delays to electromagnetic waves of the same polarization sense propagating around said ring resonator in opposite directions comprising a solid optically transparent region of the path of said waves in a steady state magnetic field; and means for extracting portions of said waves from said resonator.

12. A laser gyroscope comprising:

a plurality of reflectors defining a nonplanar ring resonator for spatially rotating the electromagnetic field distribution of such waves providing a phase difference between circularly polarized waves of opposite polarization senses to enable such waves to resonate at different frequencies;

means for imparting different phase delays to electromagnetic waves having the same polarization sense and propagating around said resonator in opposite directions comprising a solid optically transparent region of the path of said waves having a steady state magnetic field in such region; and output means for extracting portions of said waves of different polarization senses and opposite directions of propagation around said resonator.

13. A laser gyroscope in accordance with claim 12 wherein:

said ring resonator comprises a medium providing amplification of waves passing therethrough.

14. A laser gyroscope comprising:

a ring resonator, including an amplifying medium, and supporting a plurality of circularly polarized waves propagating around said ring resonator in opposite directions through said amplifying medium;

said waves being supported by means comprising means for spatially rotating the electromagnetic field distribution of said waves while such waves pass through a non-solid medium producing oppositely circularly polarized waves;

said ring resonator comprising means for producing a magnetic field parallel to a portion of the path of said waves for producing different phase delays between the waves having the same polarization sense and opposite propagation directions, and for producing the same phase delays between waves having opposite polarization senses and the same propagation direction to enable said waves to resonate at a plurality of pairs of different frequencies; and output means for extracting portions of said waves at said pairs of frequencies.

15. A laser gyroscope in accordance with claim 14 wherein:

a first segment of the path of said waves defines a first plane and a second segment of the path of said waves defines a second plane intersecting said first plane.

* * * * *